March 24, 1970     A. E. MANN     3,502,507

SOLAR CELLS WITH EXTENDED WRAP-AROUND ELECTRODES

Filed Oct. 28, 1966     2 Sheets-Sheet 1

INVENTOR.
ALFRED E. MANN
BY
*Elliott & Pastoriza*
ATTORNEYS

March 24, 1970     A. E. MANN     3,502,507
SOLAR CELLS WITH EXTENDED WRAP-AROUND ELECTRODES
Filed Oct. 28, 1966     2 Sheets-Sheet 2
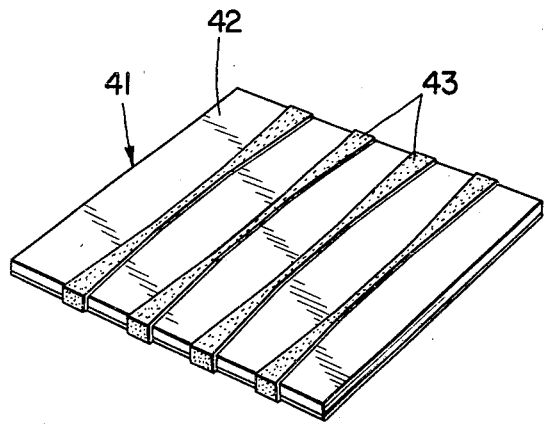
FIG. 5.
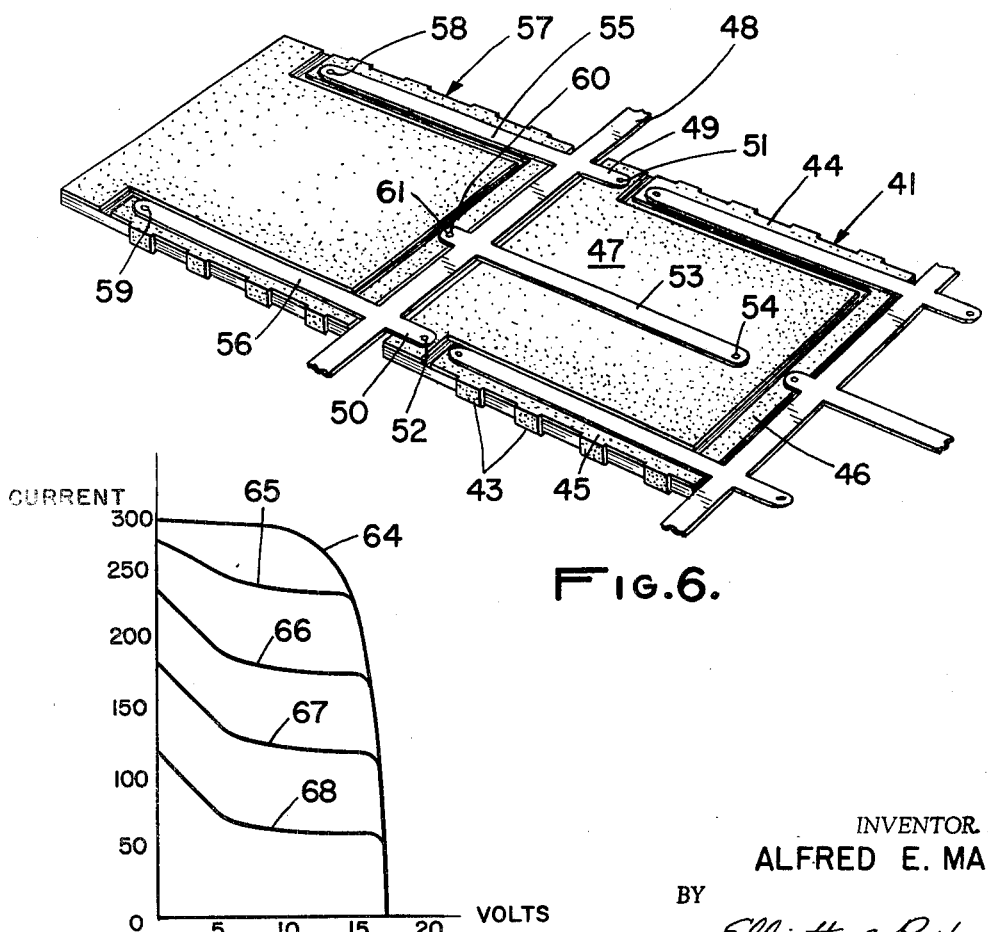
FIG. 6.
FIG. 7.
INVENTOR.
ALFRED E. MANN
BY
Elliott & Pastoriza
ATTORNEYS

United States Patent Office 3,502,507
Patented Mar. 24, 1970

3,502,507
SOLAR CELLS WITH EXTENDED WRAP-AROUND ELECTRODES
Alfred E. Mann, Sylmar, Calif., assignor to Textron, Inc., a corporation of Delaware
Filed Oct. 28, 1966, Ser. No. 590,283
Int. Cl. H01m 15/02
U.S. Cl. 136—89　　　　　　　　　　　　8 Claims

ABSTRACT OF THE DISCLOSURE

A solar cell is provided with a top solar sensitive surface wrapping around at least one edge portion of the cell to lie in close electrically separated relationship with a second electrode means on the bottom surface of the cell. The geometry of the electrodes is such that interconnecting tab or strip-like conductors can extend across the bottom electrode to effect pairs of positive and negative connection points, the connections in each pair being in close relationship to each other and the pairs themselves being at spaced portions of the cell remote from each other. With this arrangement, the risk of circuit discontinuity should the cell crack is minimized. Further, the interconnecting means lies substantially in the plane of the bottom of the cell thereby enabling the cells to be packed relatively closely to each other.

---

This invention relates generally to solar cells and more particularly to improved electrode configurations on a solar cell and improved interconnecting means for such electrode configurations for use in solar cell arrays.

In U.S. Patent Nos. Re. 25,647 and 3,340,096 and in copending patent application Ser. No. 450,597, filed Apr. 26, 1965, all assigned to the same assignee as the present invention, there are described solar cell arrays with interconnections in the form of stress relieved strips and tabs enabling the cells to be disposed in a substantially coplanar series-parallel matrix or, alternatively, in a shingled array.

In the above-mentioned copending patent application, Ser. No. 450,597, there are described improved inter connecting means in the form of strips and tabs for effecting connections between the various electrodes of cells in an array. The interconnecting means themselves include extended tabs so that connections to the bottom electrode of the cell can be effected at a point beyond the middle of the cell. By this arrangement, should a cell become damaged or cracked within the extended tab connection, part of the cell surface may still be utilized in generating energy. In addition, the continuity of a series of cells in a column is not fully broken. However, the solar cells described in said applications include a conventional top electrode means and bottom electrode means covering substantially the entire bottom surface of the cell. Thus a portion of the top solar sensitive surface is eclipsed by the top electrode and connection means. It is also necessary with this cell in a coplanar array to pass part of the interconnecting means between adjacent edges of the cells, thus limiting the closeness of packing of the cells in the array.

The foregoing disadvantages can be overcome to a considerable extent by wrapping a first electrode means in ohmic contact with the top solar sensitive surface of a cell around an edge of the cell so that it includes a surface portion on the bottom of the cell. This portion is kept in electrically separated relationship to the second or bottom electrode means. With this arrangement connections to the first and second electrode means can be made on the bottom of the cell so that such connections will not eclipse any of the top solar sensitive surface.

Further, the interconnecting means for providing a series-parallel matrix will all lie substantially in the plane of the bottom surfaces of the cells, there not being required any interconnecting means passing between adjacent cells. As a consequence, relatively dense packing of the cells in a given array can be realized.

In copending application, Ser. No. 562,791, filed July 5, 1966, for Solar Cells With Insulated Bottom Wrap-Around Electrodes, assigned to the same assignee as the present invention, there is described a novel electrode configuration for a solar cell for use in solar cell arrays. Essentially, there is disclosed the above described wrapping around an edge of the cell of a first electrode means in ohmic contact with the top solar sensitive surface of the cell so that it overlaps a portion of the second or bottom electrode means. In accord with the invention, there is provided suitable insulation to maintain the electrodes electrically separated. By the use of such insulation, great freedom is afforded in the design of the electrode configurations on the bottom of the cell so that various types of connections to the first and second electrode means on the bottom surface of the cell can be easily made.

The present invention combines various features of the rear wrap-around electrode configuration concept with the teachings of the first mentioned copending application, Ser. No. 450,597, and, in some embodiments, with the latter mentioned copending application, Ser. No. 562,791, to provide still further improved electrode configurations for solar cells and solar cell arrays.

More particularly, an object of the present invention is to provide a wrap-around electrode structure on a solar cell for use in an array of similar cells together with interconnections formed by extending conducting means such as elongated tab structures to the end of retaining within the circuit major portions of the current generating capabilities of a cell even after fracture or breaking of the cell and at the same time avoiding power losses due to current limiting which might otherwise result in a series connected column of cells containing the fractured or broken cell.

Another object is to provide an improved solar cell electrode configuration so designed that the interconnecting means may all lie substantially in the bottom plane of the cells so that close packing is realized and all interconnections may be effected from one side.

Another important object is to provide a solar cell electrode configuration in which maximum use is made of the solar sensitive surface of the cell, there being no eclipsing of the cell surface by connections to the various electrode means, all to the end that a more efficient solar cell array may be provided.

Still another important object of this invention is to provide novel electrode configurations wherein should one or more of the current pick-up paths on the solar sensitive surface of the cell become defective, it will still be possible to pick up current from the current paths.

Other objects of this invention are to provide solar cells and solar cell arrays including interconnecting means in which stress relief is provided so that the various advantages set forth in the referred to co-pending applications are fully realized.

Briefly, these and many other objects and advantages of this invention are attained by extending the top electrode means on the solar sensitive surface of a solar cell about an edge of the cell in such a manner as to extend along a bottom marginal surface portion of the cell. The second or bottom electrode means, in turn, has an exposed portion extending over the bottom surface of the cell within the marginal area covered by the first electrode means in electrically separated relation thereto. In the event the area of the first electrode means is very marginal, the exposed portion of the second electrode may constitue the entire bottom electrode. If the area covered by the first electrode means is appreciable, it is then desirable to extend the second electrode means underneath the overlying first electrode means using an insulating means over those portions of the second bottom electrode overlapped by the first electrode, all as described in the referred to copending application, Ser. No. 562,791.

With the foregoing arrangement, it is possible to use interconnecting means such as flexible strips having both short and elongated tabs, certain of the tabs extending sufficient distances across the cells to enable the positive and negative connections to the various electrodes means on the cells to be made in closely adjacent relationships so that increased reliability, should one of the cells become damaged, is realized in accordance with but improved over the teachings of copending patent application, Ser. No. 450,597.

In addition to the foregoing, both ends of the current pick-up paths constituting part of the first electrode means on the cell may extend about opposite edges of the cell to connect to marginal areas of the cell also defining part of the first electrode means in a manner to connect together so that the ends of the current pick-up paths are connected together through paths different from the surface paths. With this arrangement, should the cell be completely cracked to the extent of actually disconnecting the current pick-up paths, the dual connections to each current pick-up path at its opposite ends will enable the picking up of current from portions of the solar sensitive surface of the cell which would ordinarily be isolated by the crack.

Since connections to the electrodes themselves are effected at the bottom surfaces rather than the top surfaces, a desired close packing of the cells in a co-planar array is realizable.

A better understanding of the invention will be had by now referring to preferred embodiments thereof as illustrated in the accompanying drawings, in which:

FIGURE 5 is a top perspective view of a solar cell having a modified electrode configuration;

FIGURE 6 is a bottom perspective view of the cell of FIGURE 5 and an adjacent cell showing interconnections; and FIGURE 7 illustrates curves useful in showing the effects of cell failures in a series-parallel matrix array.

Figure 1:
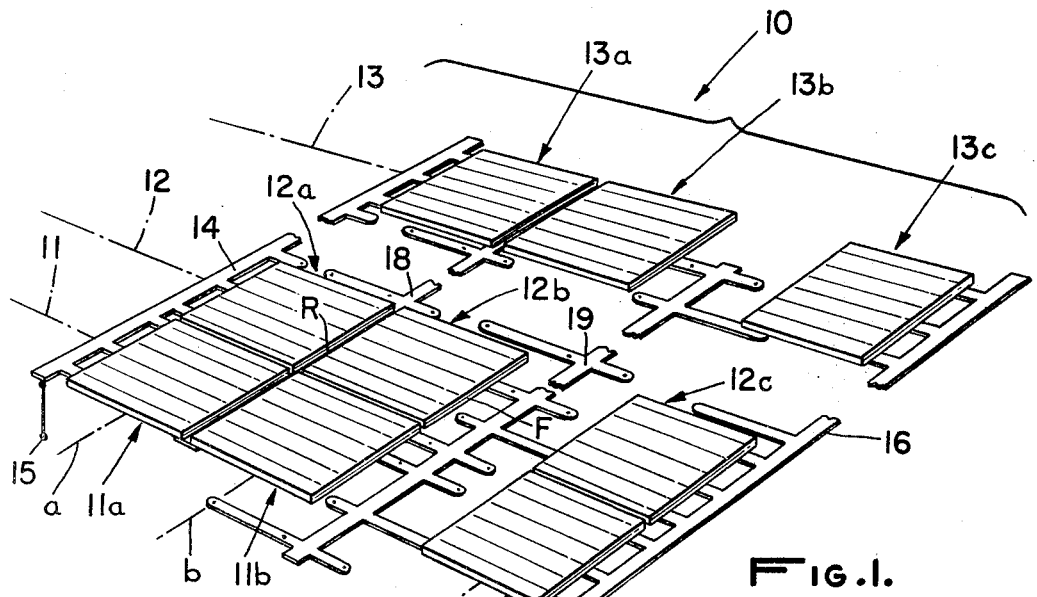
FIGURE 1 is a perspective view partially exploded of a solar cell array made up of solar cells having one of the improved electrode configurations of this invention together with a showing of the extending tab-type interconnecting means therefor.

Referring first to FIGURE 1, there is illustrated a solar cell array including a plurality of solar cells in end-to-end relationship to define columns of cells such as indicated by the dashed lines at 11, 12, and 13. The various cells in the columns are in side-by-side relationship to define rows of cells indicated by the dashed lines *a, b,* and *c.* The cells themselves making up the columns and rows are shown at 11*a*, 11*b*, and 11*c* for the column 11; 12*a*, 12*b*, and 12*c* for the column 12; and 13*a*, 13*b*, and 13*c* for the column 13. With this designation, it will be clear that the cells 11*a*, 12*a*, and 13*a* make up the first row; the cells 11*b*, 12*b*, and 13*b* make up a second row; and the cells 11*c*, 12*c*, and 13*c* make up the third row. It will be understood that many more cells may be included in each column and row than are shown.

In the particular example of the invention chosen for illustrative purposes, each of the solar cells is of the N-P type and is provided with a top electrode means including deposited current pick-up paths merging into common paths wrapped about the front and rear edges of the cell, indicated at F and R on the cell 12*b* by way of example, to overlap portions of the cell bottom, and a second electrode means on the bottom surface all as will be described in detail subsequently. A common conducting strip or bar 14 which may include suitable insulated portions connects to the bottom electrodes of the cells in the first row "*a*" in parallel and terminates at a power takeoff point 15. The other power takeoff for the array is provided by an elongated strip or conducting bar 16 connecting to a terminal 17 and to wrapped around portions of the first electrodes in the last row "*c*."

The interconnections between the various cells to provide a series-parallel matrix may be achieved by several different types of interconnecting means. In the embodiment illustrated, these interconnections are provided by an elongated strip 18 having short and extended tabs for connecting the rows "*a*" and "*b*" in series with each other, and an elongated strip 19 having extended tabs for similarly connecting the row "*b*" in series with the next successive row in the array. The elongated strips from which the tabs extend effect parallel connections of the cells in each row. In FIGURE 1, the exploded portion is provided to illustrate clearly the interconnecting strips and tabs.

Figure 2:
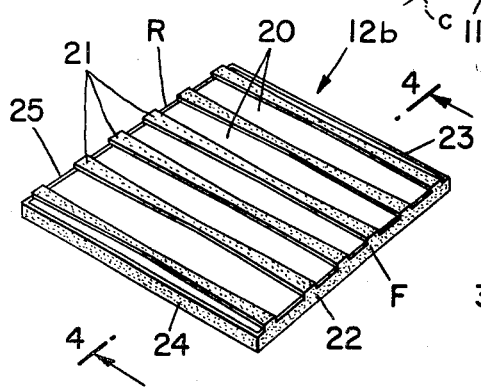
FIGURE 2 is an enlarged perspective view of one of the cells in FIGURE 1 showing the top surface thereof.
Figure 3:
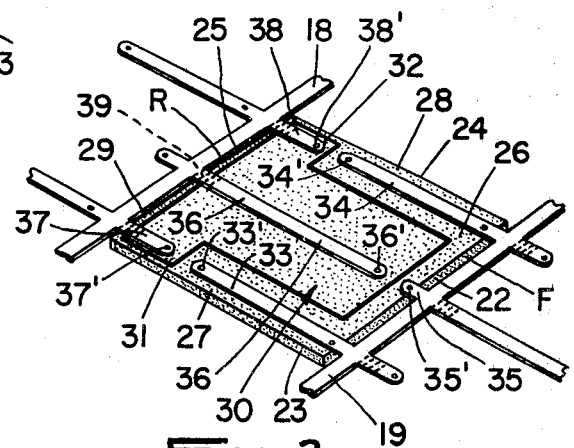
FIGURE 3 is a perspective view of the bottom surface of the cell shown in FIGURE 2, there also being illustrated the positioning of the interconnecting means on the bottom surface.

Referring now to FIGURES 2 and 3, the cell 12*b* which is typical of the other cells, is shown in greater detail wherein the configuration of the electrodes in accordance with the present invention will be clear. As shown, the top solar sensitive surface is indicated at 20 and includes current pick-up means in the form of a plurality of current paths 21 constituting part of the first electrode means extending from the front edge of the top surface F towards the rear edge R, generally parallel to the direction of the columns. As shown, these paths taper in width from their opposite ends towards their centers and have near ends merging into a common path 22 along the front edge which then extends around the side edges as at 23 and 24. The paths 23 and 24 extend along the side edges to the rear edge R at 25 to connect to the far ends of the current pick-up paths 21.

With particular reference to FIGURE 3, it will be noted that the first electrode portion 22 at the front edge F also wraps about the rear bottom surface of the cell at 26 and the paths 23 and 24 similarly wrap around the bottom side portions as at 27 and 28 along the bottom of the cell. It will also be noted that the marginal portions 27 and 28 may be merged into a marginal portion 29 which, in turn, may extend from the portion 25 connecting to the far ends of the current paths described in FIGURE 2 at the rear edge R. There is thus defined by the wrapped around portions of the first electrode means on the bottom cell a closed frame.

The second ohmic contact surface or electrode is designed 30 and has its exposed surface enclosed within the frame in spaced relation to the first electrode so that the same will be insulated from each other. As shown, this second electrode has an exposed portion extending toward the marginal portion 26 of the first electrode between the extended wrapped around portions 27 and 28 in more or less of a tongue and groove arrangement and also includes laterally extending exposed portions 31 and 32 terminating short of the marginal portions of the first electrode at the far end portions of the bottom surface of the cell.

With the foregoing arrangement, the interconnecting means in the form of the elongated strips 18 and 19, as shown in FIGURE 1, may effect connections to the various electrodes at various points across the cells to realize the desired extended tab feature fully described in copending application, Ser. No. 450,597. Thus, the strip 19 as shown in FIGURE 3 includes extending tabs 33 and 34 connecting to the wrapped around portions of the first electrode as at points 33' and 34' close to the exposed portions 31 and 32 of the second electrode means. An additional short tab 35 connects to the front wrapped around portion of the first electrode means as at 35' to provide a redundancy and also to assure circuit continuity in the event of cracking of the cell at portions near to the front edge.

The elongated central strip 18 shown in FIGURE 3 in turn includes an extending tab 36 connecting to the second electrode 30 as at a point 36' close to the connection point of the tab 35, and smaller tabs 37 and 38 connecting to the extended portions 31 and 32 as at 37' and 38'. By this arrangement, there are effected pairs of positive and negative connections on either side of the middle of the cell by each of the various extending tabs, such as the pairs 33'–37'; 34'–38'; and 35'–36'.

Because of the closed framing effected by the first electrode means for this embodiment, it is desirable to insulate either the surfaces of the cell or the underside of the overlying extending tabs at various points such as indicated at 39 for the tab 36 so that the tabs will not short-circuit the first and second electrodes. It should, of course, be realized that other types of interconnecting means could be employed such as a printed circuit provided on the substrate over which the cells are positioned and having suitable surface insulated portions. However, by using the flexible extended tabs with insulated portions such as thin plastic coatings on certain surface areas of the tabs, the desired feature of non-rigidity in the connections of the various cells is achieved to provide desired stress relief by accommodating any slight relative shifting of the cells as a consequence of thermal contraction and expansion or mechanical stress as could result from vibrations and the like.

If the widths of the marginal wrapped around portions 26, 27, and 28 in FIGURE 3 are relaitvely large as illustrated, a substantial area of ohmic contact between the bottom surface of the cell and the bottom electrode 30 can still be realized by having the first electrode means overlapping portions of the bottom electrode itself. This overlapping is illustrated in FIGURE 4 wherein the bottom electrode 30 includes unexposed areas underlying the wrapped around marginal portions 27 and 28 of the first or top electrode means.

Figure 4:
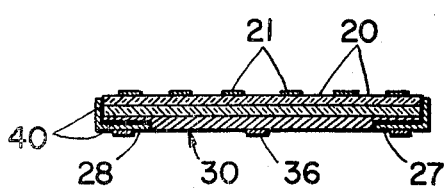
FIGURE 4 is a cross-section in the direction of the arrows 4—4 of FIGURE 2.

In this latter case, and as shown in FIGURE 4, suitable insulation 40 is provided between the overlapping portions of the top and bottom electrodes to hold them in electrically separated relationship all in accord with the teachings in copending application Ser. No. 562,791. Thus, by the use of such insulation, greater freedom is provided in the electrode design to permit variations in the extended tab structure and its points of connection.

Referring to FIGURES 5 and 6, there is illustrated a modified electrode configuration in accordance with the present invention. In this embodiment, there is provided a solar cell 41 having a solar sensitive surface 42 with first electrode means in the form of current pick-up paths 43. In the design illustrated, the current pick-up paths run at right angles to the direction of a column of cells when in an array and thus at right angles to the pick-up paths of the cells illustrated in FIGURES 1, 2, and 3.

With particular reference to FIGURE 6, it will be noted that the current pick-up paths wrap around opposite sides of the cell 41 to merge into portions 44 and 45 along the marginal bottom surfaces of these sides and also into a common path 46 along an end marginal portion of the bottom surface of the cell 41. Preferably, in this embodiment the margnal portions are sufficiently narrow that the bottom or second electrode, indicated at 47, may cover substantially the entire bottom surface of the cell without underlying any of the marginal portions so that insulation is not necessary.

With the foregoing electrode design, it will be evident that the current pick-up paths 43 connect at opposite ends to the wrapped around portions.

With this design, a suitable interconnecting strip and tab structure may be provided similar in certain respects to the strip 18 and tabs described in FIGURES 1 and 3. In FIGURE 6, the interconnecting structure takes the form of an elongated strip 48 having extending short tabs 49 and 50 connecting to the bottom electrode at the adjacent edge as at 51 and 52. The strip 48 also includes an elongated or extended central tab 53 connecting to the bottom electrode across the cell at 54.

The opposite side of the strip 48 includes elongated extending tabs 55 and 56 for connection across the cell to the wrapped-around first electrode means of a further cell 57, corresponding to the cell 41, as at 58 and 59. A suitable short tab 60 similarly connects to the wrapped-around portion of the first electrode means at the near adjacent edge of the cell as at 61.

It will be evident from the foregoing description that a matrix of cells may be formed in suitable columns and rows as in the case of the cells described in FIGURE 1 with suitable positive and negative connections being effected at closely adjacent points distributed over the cell area.

In the operation of the cells, power may be removed from the take-off points described in FIGURE 1 provided that all of the cells are in operating condition. The redundancy of the connections is important with regard to reliability of operation. Should one of the cells crack, there is a high probability that series continuity will still be retained through the extended tab structures. This is a consequence of the tabs extending across the cell so that positive and negative connections are close to each other in the form of redundant pairs. Further, since the current pick-up paths are connected at both ends and wrapped around portions of the opposite sides of the cells, current picked up from the solar cell surfaces on either side of any crack may still be passed to the interconnecting tab so that the surface of the cell, even though cracked, is still useful in generating current.

The added advantages realized from the foregoing interconnecting tabs and electrode design will be evident by referring to FIGURE 7 which illustrates the effect of cell failures on performance. The particular curves shown were derived from a module of twenty-nine series connected sub-modules each with five cells connected in parallel. The failures represented are complete open circuits as a consequence of cracking of the cells.

The output characteristics defined by the curve 64 of FIGURE 7 represents the output current as a function of voltage when all the cells are operating properly. If one cell should open as a consequence of a crack or other cause, it will be noted that the current drops as indicated by the curve 65. If two of the cells in any one sub-module should open, the output characteristic is as represented by the curve 66, three open cells in one module by the curve 67, and four open cells in one module by the curve 68. However, with the extended tab connections as described in the present invention, the series continuity will ordinarily be retained in a column of cells in which one of the cells is cracked. Further, the current pick-up paths being connected at opposite ends will continue to function to provide power from solar sensitive surfaces on either side of the cracked portion of the cell.

From the foregoing description, it will be evident that the present invention has provided an improved solar cell and solar cell arrays in which the advantages of increased reliability even though a cell may be damaged, together with stress relief, close packing in a co-planar array, and maximum use of the solar sensitive surfaces of the cells are all realized.

While only certain types of electrode designs on the cell have been illustrated, such as the examples of the tongue and groove or closed frame structure, it will be evident to those skilled in the art that many variations in this electrode design can be carried out. Such electrode variations are particularly feasible when insulation is employed to electrically separate the overlapped portion of the top first electrode from the bottom or second electrode.

Further, while the interconnecting means themselves have been referred to as strips with extended tabs, any equivalent elongated flexible current carrying medium such as a wire mesh or other wire configuration following similar paths to connect to the connection points of the tabs as described may be used. The terminology "strip" and "tab" is meant to encompass such current carrying media.

The invention accordingly is not to be thought of as limited to the particular embodiments set forth merely for illustrative purposes.

What is claimed is:

1. A solar cell having a first electrode means on its top solar sensitive surface with portions wrapping about opposite edge portions of said cell and including a plurality or current pick-up means extending along the top surface of said cell between said edge portions, said pick-up means electrically connecting at its opposite ends to the wrapped around portions of said first electrode means, each of said pick-up means tapering in width from its opposite ends towards its center.

2. A solar cell having a first electrode means on its top solar sensitive surface wrapping around at least one edge portion of said cell; and a second electrode means disposed on a bottom portion of said cell in electrically separated relationship to said first electrode means, said first electrode means including a portion extending along said bottom surface whereby a connection to said first electrode means can be effected on the bottom of said cell at a point close to a connection to said second electrode means to provide a positive and negative connection in close relationship to each other adjacent to an edge of said cell, said first electrode means also wrapping around an opposite edge portion of said cell opposite said one edge portion and including current pick-up means extending along the top surface of said cell between the said one edge portion and said opposite edge portion and connecting at opposite ends to the portions of said first electrode means wrapped around said edge portions, whereby another positive and negative connection close to each other and to said opposite edge portion can be effected and thereby be in a position remote from said first mentioned connections.

3. A solar cell having a first electrode means on its top solar sensitive surface wrapping around at least one edge portion of said cell; and a second electrode means disposed on a bottom portion of said cell in electrically separated relationship to said first electrode means, said first electrode means including a portion extending along said bottom surface whereby a connection to said first electrode means can be effected on the bottom of said cell at a point close to a connection to said second electrode means to provide a positive and negative connection in close relationship to each other adjacent to an edge of said cell, said first electrode means extending along all of the marginal bottom portions of said cell adjacent to all edges to define a closed frame about said second electrode means.

4. A solar cell having a first electrode means on its top solar sensitive surface wrapping around at least one edge portion of said cell; and a second electrode means disposed on a bottom portion of said cell in electrically separated relationship to said first electrode means, said first electrode means including a portion extending along said bottom surface whereby a connection to said first electrode means can be effected on the bottom of said cell at a point close to a connection to said second electrode means to provide a positive and negative connection in close relationship to each other adjacent to an edge of said cell, said first electrode means extending along three marginal bottom portions of said cell, said second electrode means having an exposed surface between opposite ones of said marginal bottom portions to define a tongue and groove pattern.

5. A solar cell array comprising: columns and rows of cells, each cell having a top solar sensitive surface and a first electrode means wrapped about at least one edge portion of said cell to extend along the bottom of said cell; a second electrode means disposed on a bottom surface portion of said cell in electrically separated relationship to the wrapped about portion of said first electrode means; and interconnecting means for connecting the cells in each column in series with each other and the cells in each row in parallel with each other to provide a series-parallel matrix, said interconnecting means effecting connections to portions of the wrapped about first electrode means extending along on the bottoms of said cells, and to the second electrode means on the bottoms of said cells, at closely spaced points, said interconnecting means including flexible conducting means extending in opposite directions to effect the series connections between cells in each column, at least one portion of the flexible means connected to said first electrode means on each cell extending across a portion of the cell to effect contact therewith at a point close to the connection to the second electrode means to define one pair of said closely spaced points so that the interconnecting means provides pairs of positive and negative connection points, the two connections in a pair being in close relationship to each other and the pairs themselves at spaced portions of the cell remote from each other so that circuit continuity is maintained through a cell should it crack near its mid-area and whereby the interconnecting means lies substantially in the plane of the bottom of said cells thereby enabling said cells to be packed relatively closely to each other.

6. An array according to claim 5, in which said first electrode means is wrapped about all of the marginal bottom portions of said cell adjacent to all edges to define a closed frame about said second electrode means.

7. An array according to claim 5, in which said first electrode means is wrapped around front and rear edge portions of said cell and includes current pick-up paths extending along the top surface of said cell between said edge portions in directions generally parallel to the direction of said columns and connecting at opposite ends to the portions of said first electrode means extending around said front and rear edge portions.

8. An array according to claim 5, in which said first electrode means is wrapped around at least two opposite edge portions of said cell and includes current pick-up paths extending along the top surface of said cell between said edge portions in directions generally at right angles to the direction of said columns and connecting at opposite ends to the portions of said first electrode means extending around said edge portions.

References Cited

UNITED STATES PATENTS

| Re. 25,647 | 9/1964 | Mann et al. | 136—89 |
| 3,255,047 | 6/1966 | Escoffery | 136—89 |
| 3,350,775 | 11/1967 | Iles | 136—89 X |
| 3,421,943 | 1/1969 | Shaikh et al. | 136—89 |

ALLEN B. CURTIS, Primary Examiner

M. J. ANDREWS, Assistant Examiner